United States Patent Office 3,689,291
Patented Sept. 5, 1972

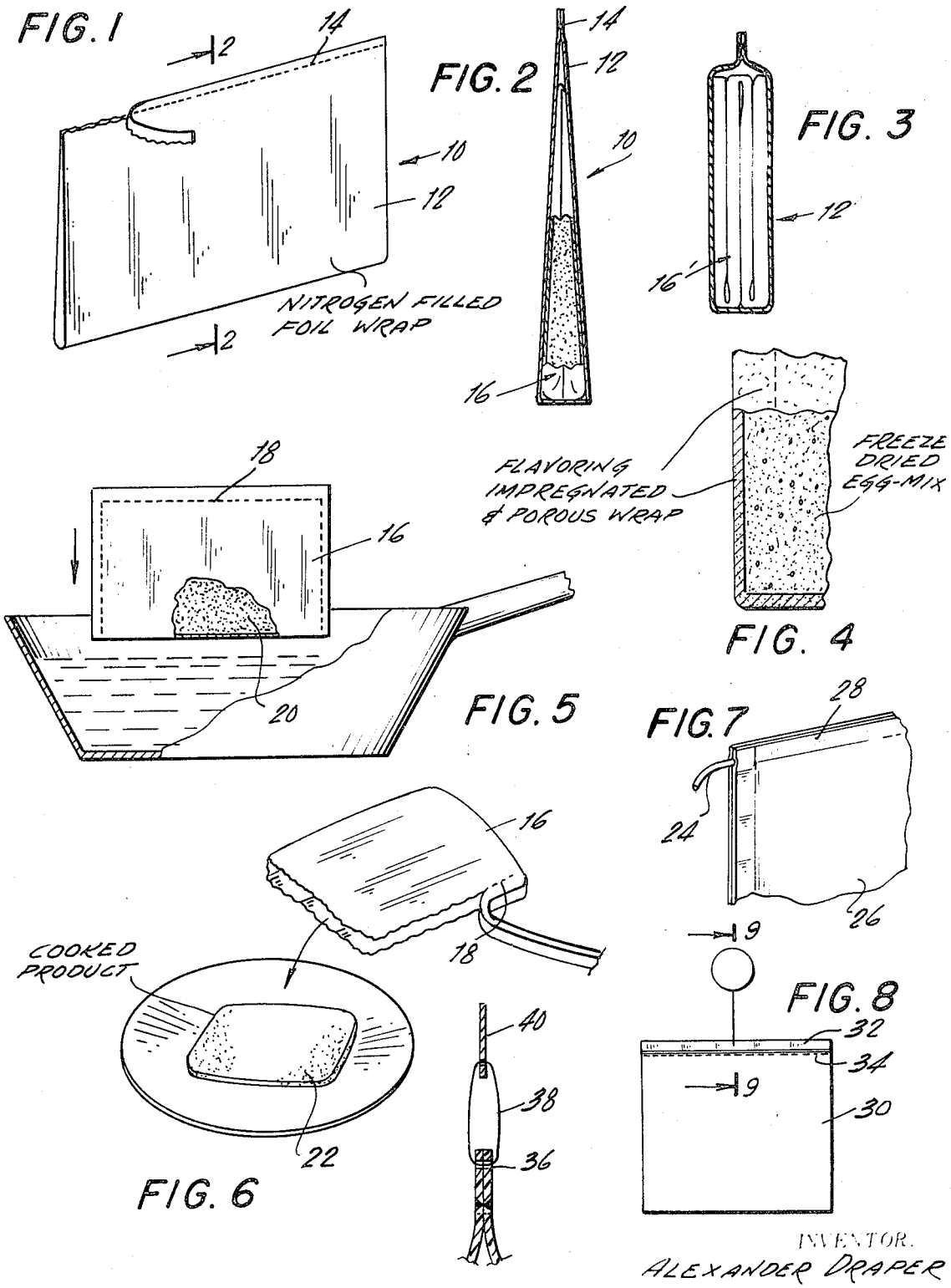

3,689,291
COOKING PACKAGE FOR FREEZE-DRIED EGGS
Alexander Draper, Garrison, N.Y. 10524
Filed Mar. 20, 1969, Ser. No. 808,846
Int. Cl. B65b 29/02
U.S. Cl. 99—177
4 Claims

ABSTRACT OF THE DISCLOSURE

A food package adapted to be cooked by contact with a hot cooking liquid which includes an outer envelope of nitrogen filled metallic foil, an inner container of porous fibrous material, and coarsely divided particles of freeze-dried eggs in the container so arranged that upon cooking an omelete-like portion of foodstuff is obtained. Flavoring may be provided.

---

This invention relates to food packaging and more particularly to a cooking package for freeze-dried eggs and like edible substances.

In the preserving and packing of foodstuffs, it has been ascertained that the freeze-drying of eggs gives rise to an extended shelf life for these edible goods, especially when they are packaged in a relatively inert atmosphere such as nitrogen. Thus, the eggs are maintained in edible and pure condition for long periods without any substantial decrease in the flavor or nutrient value thereof. However, these freeze-dried eggs when brought into contact with a hot cooking liquid usually form discrete and separate small masses because upon freeze-drying the egg is comminuted into relatively small discrete particles.

It is therefore an object of the present invention to reconstitute the freeze-dried egg particles into an omelette-like shaped integral mass by way of packaging and cooking in the package.

This invention features the use of a relatively flat container of a fibrous porous material such as paper, which holds the discrete particles of freeze-dried eggs in a slightly compacted state so that upon bringing the container into contact with a hot cooking liquid an unusual and unexpected result is obtained in that an integral omelette-like portion is obtained for convenient serving and for rendering the foodstuff more appetizing.

Another object of the invention resides in the provision of a food package for an individual serving of an egg omelette which is especially adapted for use in vending machines and for providing an instant breakfast for a traveller or guest at an inn or motel.

Still further objects and features of this invention reside in the provision of a food package that is attractive in appearance, inexpensive to manufacture, which may be easily cooked and is arranged for facilitating the serving of the contents.

These, together with the various ancillary objects and features of this invention, which will become apparent as the following description proceeds, are attained by this cooking package for freeze-dried eggs, preferred embodiments of which are illustrated in the accompanying drawings, by way of example only, wherein:

FIG. 1 is a perspective view of a food package constructed in accordance with the concept of the present invention;

FIG. 2 is a vertical sectional view taken along the plane of line 2—2 in FIG. 1;

FIG. 3 is a view similar to FIG. 2, but showing a modified form of food package;

FIG. 4 is an enlarged sectional detail view showing the various portions of the food package;

FIG. 5 is a pictorial representation with parts being broken away for clarity, illustrating a manner in which this food package may be cooked;

FIG. 6 is a schematic view illustrating the manner in which the food product is served;

FIG. 7 is a partial perspective view illustrating a detail of construction of a modified form of the food package;

FIG. 8 is an elevational view of a further embodiment of the food package; and,

FIG. 9 is a sectional detail view taken along the plane of line 9—9 in FIG. 8.

With continuing reference to the accompanying drawings, wherein like reference numerals designate similar parts throughout the various views, reference numeral 10 generally designates a food package constructed in accordance with the present invention. This food package includes an exterior metal foil envelope wrap 12 which is gas tight and filled with a relatively inert atmosphere of nitrogen. The one edge of the envelope may have frangible serrations 14 for facilitating the opening of the envelope wrap 12. Within the envelope wrap 12 is a container 16 formed of a fibrous porous material such as paper, thermoplastic coated paper-like material, or the like. The container 16 is relatively flat and generally rectangular in configuration, as can be best seen in FIG. 5. However, the container 16' as shown in FIG. 3 is folded to achieve a substantially W shape if it is desired to pack portions for more than one person in a single metallic foil envelope wrap 12'. The container 16 is generally rectangular in shape and may be formed from a single sheet of fibrous porous material, such as paper, which is bonded along its peripheral edges, which may be heat sealed or stitched along three peripheral edges to close the container. Perforations or serrations 18 are preferably formed along three peripheral edges so as to enable the speedy opening of the container 16, as shown in FIG. 6, for delivery of the food portion in a convenient manner out of the container for serving. The paper material from which the container 16 is formed is provided with suitable flavoring. This may be made by coating or impregnating the inner surface or surfaces of the container 16 with a suitable flavoring, such as particles of bacon, onion, garlic, cheese, chive, sausage, hickory salt, ham, and tomato. Alternatively, during the manufacturing process for the paper of which the container 16 is formed, particles of these flavoring materials may be embedded in the fibers.

Disposed in the container 16 is the foodstuff 20 which consists of freeze-dried eggs in relatively coarse, but discrete particles which because of the flat rectangular shape of the container 16 are urged into abutting relationship with adjacent particles and slightly compacted. When the container 16 is brought into contact with a hot cooking liquid such as water at a temperature of 160° and upward, an unusual and unexpected result is obtained. Upon cooking of the eggs from three to eight minutes, depending upon the temperature of the liquid, all of the particles of eggs cohesively bind into an integral mass which, because of the shape, assumes an appetizing omelette-like shaped mass represented by the cooked product 22 as shown in FIG. 6. Further, the hot water carries the flavor and imparts the flavoring corresponding to the flavoring material to the eggs making them even more appetizing and tasty.

In FIG. 7 there is shown a modified form of the invention wherein a tear string 24 is utilized in lieu of the perforations or serrations 18 so as to facilitate the opening of the package 26 along its upper edge 28.

In FIG. 8 there is shown a package 30 especially adapted for facilitating the immersion in hot cooking liquid. In this form of the invention the container 30 is heat sealed at its upper edge 32 and is provided with serrations 34 for facilitating the ripping off of the upper edge 32. Extending through an aperture 36 in the upper edge 32 is a string or cord 38 to which a disc or card 40 or any suitable shape may be attached on which suitable advertising indicia or the like may be printed and which facilitates the handling of the container 30.

It is to be understood that the package need not be immersed in a container of cooking liquid, but as a matter of fact it is merely necessary to pour hot water or boiling water over the package to satisfactorily cook the eggs and form the omelette.

A latitude of modification, change and substitution is intended in the foregoing disclosure, and in some instances some features of the invention will be employed without a corresponding use of other features. Accordingly, it is appropriate that the appended claims be construed broadly and in a manner consistent with the spirit and scope of the invention herein.

I claim:

1. A food package adapted to be cooked by contact with a hot cooking liquid to form an omelet-like cohesive integral mass comprising a fibrous porous relatively flat and generally rectangular container, means formed in said container for facilitating the opening of said container along at least one end thereof, coarsely divided particles of freeze-dried eggs disposed in said container with said particles in abutting contact with adjacent particles, whereby said container slightly compacts said particles of freeze-dried eggs so that after said container has been placed in contact with a hot cooking liquid said particles cohesively combine to form an integral omelet-like portion for serving.

2. A food package according to claim 1, wherein the inner surface of said container has a coating of an edible flavoring material, said edible flavoring material including particles selected from the group consisting of bacon, onion, garlic, cheese, chive, sausage, hickory salt, ham, and tomato.

3. A food package according to claim 1, wherein the fibrous material of said container has embedded therein particles of an edible flavoring material.

4. A food package according to claim 1, including a gas tight foil envelope wrap about said container, and a filling of nitrogen in said envelope wrap, said container being folded in substantially a W-shape in said envelope wrap.

References Cited

UNITED STATES PATENTS

| | | | |
|---|---|---|---|
| 2,015,972 | 10/1935 | Sodergren. | |
| 2,087,236 | 7/1937 | Anders | 99—77.1 |
| 2,445,752 | 7/1948 | Adams | 99—199 X |
| 2,907,173 | 10/1959 | Robbins. | |
| 2,969,292 | 1/1961 | Heller | 99—113 UX |
| 3,077,411 | 2/1963 | Mitchell | 99—210 |
| 3,126,284 | 3/1964 | Howerin | 99—77.1 |
| 3,222,194 | 12/1965 | Gorman et al. | 99—113 UX |
| 3,281,950 | 11/1966 | Kautz | 99—199 UX |
| 2,194,451 | 3/1940 | Soubier | 99—171 CP |
| 2,357,258 | 8/1944 | Harris | 99—140 X |
| 3,006,764 | 10/1961 | Stephenson et al. | 99—141 A X |
| 3,162,539 | 12/1964 | Repko | 99—171 CP |
| 3,388,789 | 6/1968 | Simandl et al. | 99—171 CP X |
| 3,463,641 | 8/1969 | Berardi et al. | 99—210 X |
| 3,522,061 | 7/1970 | Whiteford | 99—177 |

FOREIGN PATENTS

| | | | |
|---|---|---|---|
| 482,583 | 4/1952 | Canada | 99—171 H |

FRANK W. LUTTER, Primary Examiner

S. L. WEINSTEIN, Assistant Examiner

U.S. Cl. X.R.

99—171 H, 171 PP, 171 P, 189; 206—.5, 46 P.V.